March 30, 1948.  C. A. COOK  2,438,539
COMBINED AUXILIARY TRANSMISSION AND POWER TAKE-OFF
Filed April 19, 1945  4 Sheets-Sheet 1

Inventor
Charles A. Cook

March 30, 1948.  C. A. COOK  2,438,539
COMBINED AUXILIARY TRANSMISSION AND POWER TAKE-OFF
Filed April 19, 1945   4 Sheets-Sheet 2

Inventor
Charles A. Cook

March 30, 1948.  C. A. COOK  2,438,539
COMBINED AUXILIARY TRANSMISSION AND POWER TAKE-OFF
Filed April 19, 1945  4 Sheets-Sheet 3

Inventor
Charles A. Cook

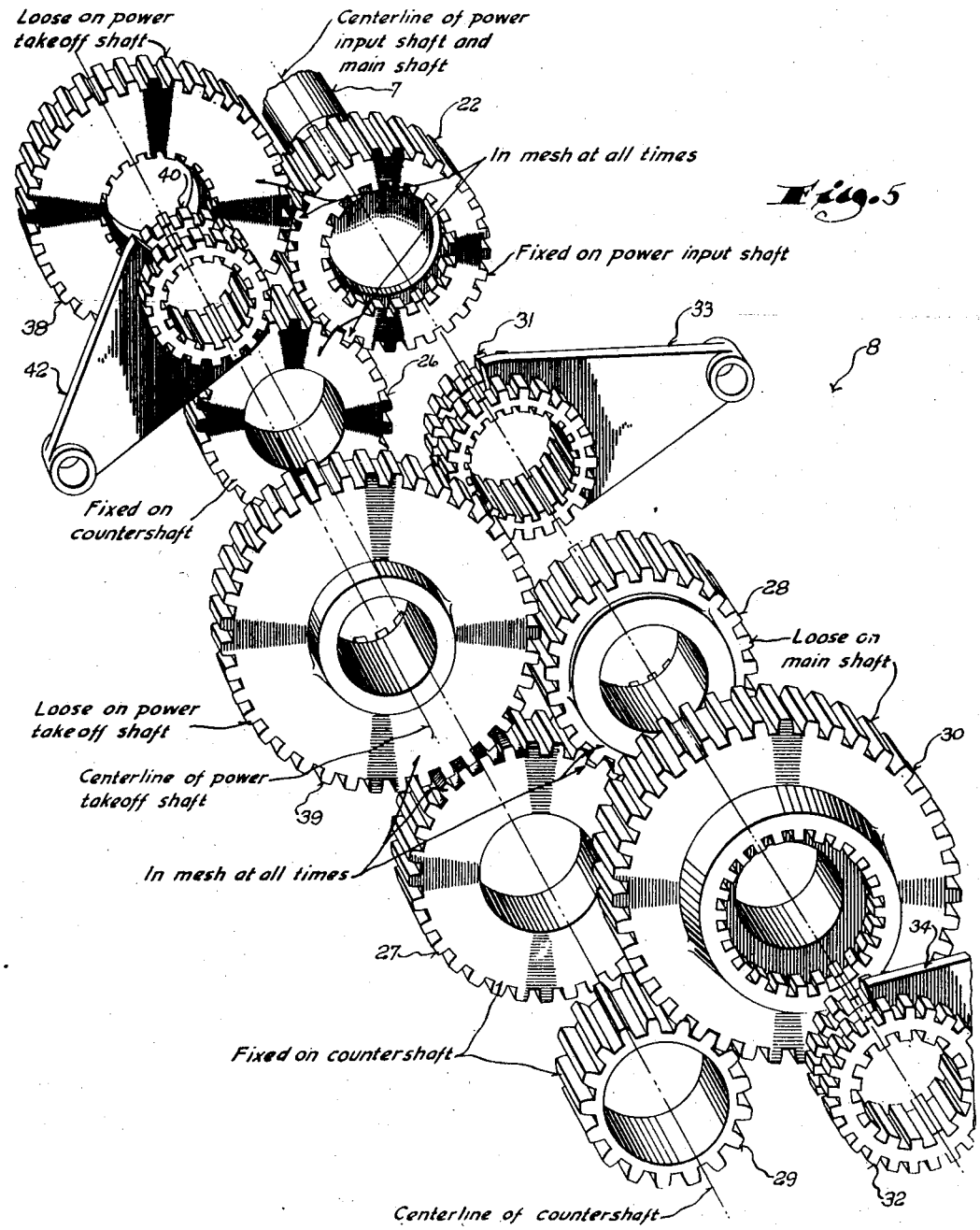

Patented Mar. 30, 1948

2,438,539

UNITED STATES PATENT OFFICE 2,438,539

COMBINED AUXILIARY TRANSMISSION AND POWER TAKE-OFF

Charles A. Cook, Oshkosh, Wis., assignor to Fuller Manufacturing Co., Kalamazoo, Mich., a corporation of Delaware Application April 19, 1945, Serial No. 589,189

6 Claims. (Cl. 74—11)

This invention relates to auxiliary transmission and power take-off units for automotive trucks and has as its general purpose to provide an auxiliary transmission and full torque power take-off combined in one unitary structure.

Heavy duty motor trucks are often required to negotiate difficult off-the-highway terrain for which the standard transmission does not provide a satisfactory gear reduction. It has been the practice, therefore, to equip such automotive trucks with auxiliary transmissions which afforded the necessary underdrive to enable the trucks to better negotiate all types of terrain.

Many of the auxiliary transmissions heretofore in use are also equipped with an overdrive or step-up gear to provide higher operating speeds when on good highways.

Most of these trucks also have need for what is generally known as a power take-off. This power take-off is used for driving various instrumentalities mounted on the truck. In trucks designed for use in the oil fields, for instance, these instrumentalities are in the form of winches, light drilling equipment and various types of pumps. Many of the instrumentalities thus driven by the power take-off require forward and reverse directions of rotation and must be capable of operation while the truck is in motion; hence the power take-off should incorporate provision for reversing the direction of the drive.

In the past these requirements of heavy duty trucks, and particularly those adapted for use in oil fields, were met in several different ways, none of which, however, has proved fully satisfactory. For instance, if the power take-off is achieved through the conventional practice of attaching a small power take-off unit to the side of the main truck transmission on what is generally known as an SAE standard power take-off opening, only very light work can be accommodated. Heavy winches and other equipment carried by trucks operating in oil fields, for instance, cannot be driven by such light units.

Another power take-off construction used in the past replaces the top cover of the auxiliary transmission. This type is heavy enough for the large winches, but does not answer the purpose for drilling equipment as it is not attached to the auxiliary transmission housing firmly enough to permit the driving sprocket to be attached directly to the power take-off shaft. An outboard bearing or supplemental support attached to some other structural member thus had to be provided, and being mounted on top of the auxiliary transmission, was generally so high as to be in the way of other equipment mounted on or to be placed on the truck.

It has, therefore, been the practice in the past where it was necessary to drive heavy duty pumps or drilling equipment to increase the length of the truck and install a specially bu lt power take-off transmission. This obviously complicates the construction of the truck and is very expensive.

The disadvantages of all past expedients are overcome in the present invention by incorporating the power take-off in the auxiliary transmission in such a way that its inclusion does not interfere with the normal operation of the auxiliary transmission and does not in anywise complicate its design.

An advantage of the present invention is that the auxiliary transmission can be installed in a truck minus the power take-off if the customer at the time he purchases the truck has no need for the power take-off, and then at a later date when the need for a power take-off arises, the change can be made very readily without in anywise altering the general design of the truck or relocating any of the equipment.

Another advantage of the present invention lies in the fact that the power take-off shaft may be heavy enough to have a driving sprocket mounted directly thereon and at either end of the shaft to thereby accommodate different locations of the instrumentalities to be driven.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which:

Figure 5 is a perspective view illustrating the arrangement of the gearing of the auxiliary transmission and the power take-off.

Figure 1:
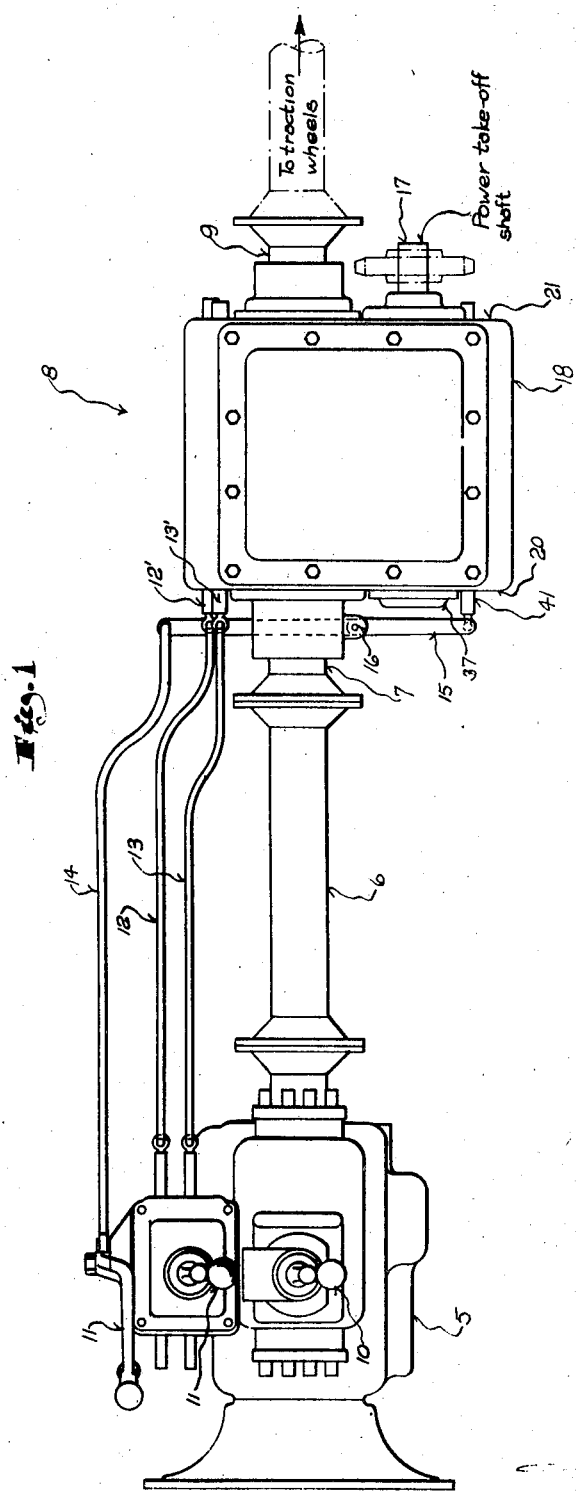
Figure 1 is a plan view of a conventional truck transmission assembly incorporating the combined auxiliary transmission and power take-off of this invention.

Referring now particularly to the accompanying drawings, in which like numerals indicate like parts, the numeral 5 designates the standard or conventional transmission of a motor truck, the input shaft of which is connected to the engine, not shown, while its output shaft is connected through a torque tube 6 with the power input shaft 7 of the combined auxiliary transmission and power take-off unit of this invention, indicated generally by the numeral 8. The main driven shaft 9 of the auxiliary transmission is adapted to be connected to the differential, not shown, and thus to the traction wheels in the conventional manner.

Selection of the gear ratios in the standard transmission 5 is effected in the customary manner by means of a gear shift lever 10, while the combined auxiliary transmission and power take-off unit 8 is controlled by a second gear shift lever 11 mounted alongside the lever 10 so as to be readily accessible to the operator.

Motion of the lever 11 to effect either an overdrive or an underdrive is transmitted to the shifting mechanism within the unit 8 through links 12 and 13. Another hand lever 11' controls the direction of rotation of the power take-off shaft 17 through a link 14 and a lever 15 medially pivoted as at 16.

As will appear more fully hereinafter, the manner in which the direction of rotation of the power take-off shaft is effected is exceedingly simple, and in nowise dependent upon the speed in which the auxiliary transmission happens to be engaged. A simple back and forth motion of the hand lever 11' provides either forward or reverse rotation of the power take-off shaft, and, of course, with the hand lever 11' in "neutral" no power is transmitted to the shaft 17.

The combined auxiliary transmission and power take-off unit 8 is wholly contained within a housing 18 having a removable cover 19 and provided with front and rear end walls 20 and 21. The power input shaft 7 enters the housing through the front wall, being journalled in bearings carried thereby. Its inner end has a main gear 22 fixed thereon so as to rotate in unison with the power input shaft.

This main gear 22 has a pilot bearing 23 mounted therein in which the forward end of the main driven shaft 9 is journalled, its opposite end being journalled in a bearing 24 carried by the rear wall 21. Beneath the main shaft and substantially on the median plane of the auxiliary transmission housing is a countershaft 25 the ends of which are journalled in suitable bearings carried by the housing end walls 20 and 21. This countershaft has three gears fixed thereon. Its foremost gear 26 is at all times in mesh with the main gear 22. The middle gear 27 is at all times in mesh with a gear 28 normally loose on the main shaft 9, and the rearmost gear 29 is at all times in mesh with a gear 30 normally loose on the main shaft. The gears 27 and 28 constitute an overdrive gear set, while the gears 29 and 30 constitute an underdrive gear set.

Either of the gears 28 or 30 may be drivingly secured to the main shaft by proper actuation of complementary clutch members 31 and 32, respectively. Both of these clutch members or collars are slidably splined on the main shaft and have clutch teeth engageable with complementary teeth on the gears 28 and 30.

Figure 2:
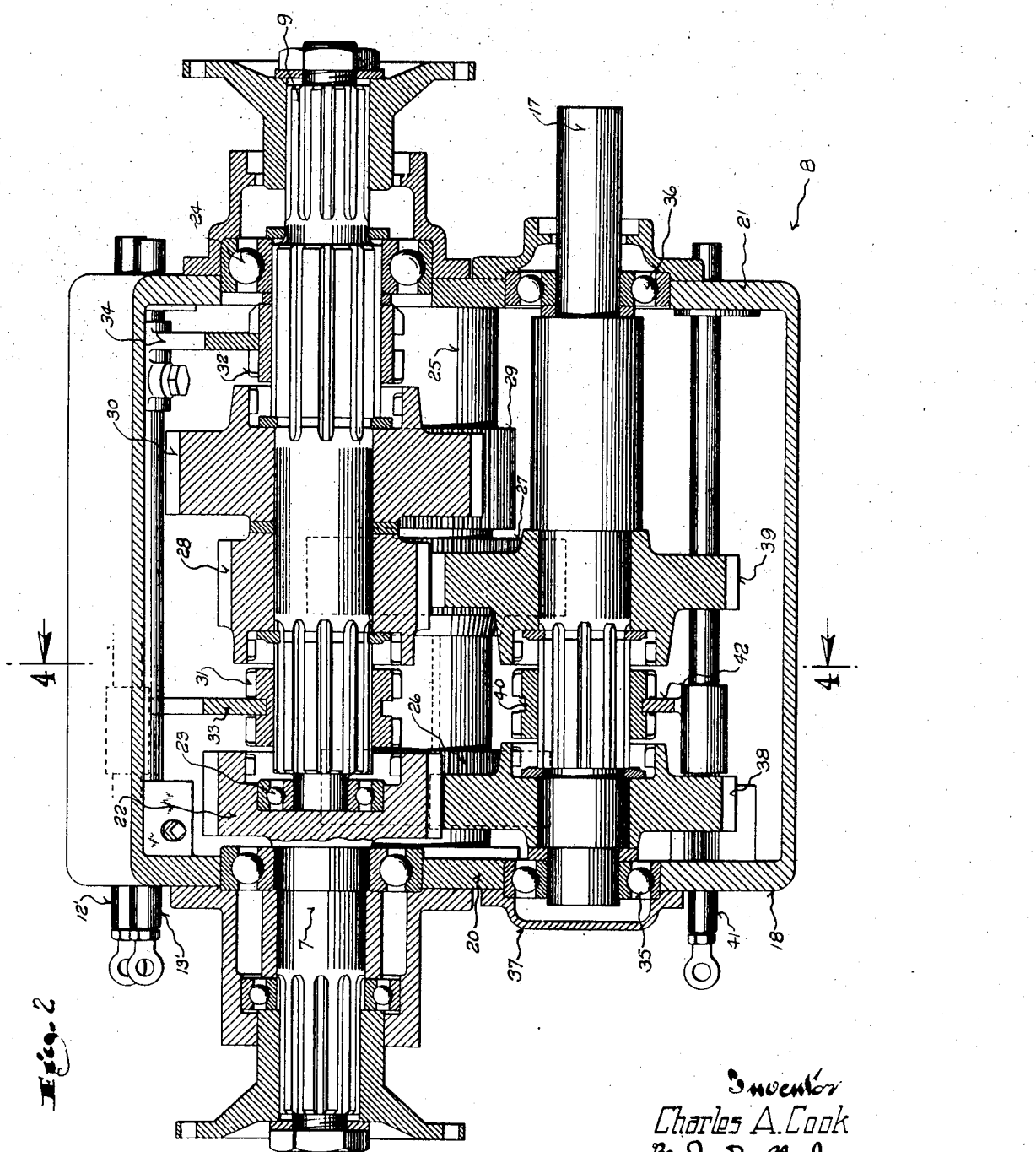
Figure 2 is a horizontal sectional view through the combined auxiliary transmission ad power take-off, taken on the plane of the line 2—2 in Figure 4.
Figure 3:
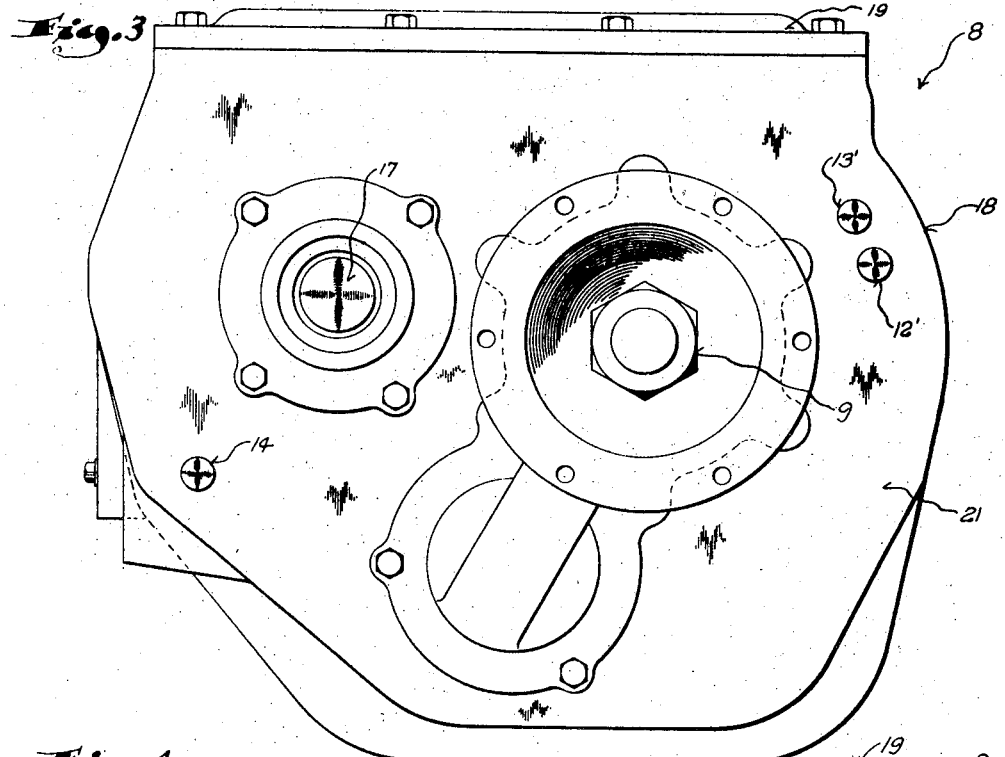
Figure 3 is a rear end view of the combined auxiliary transmission and power take-off.
Figure 4:
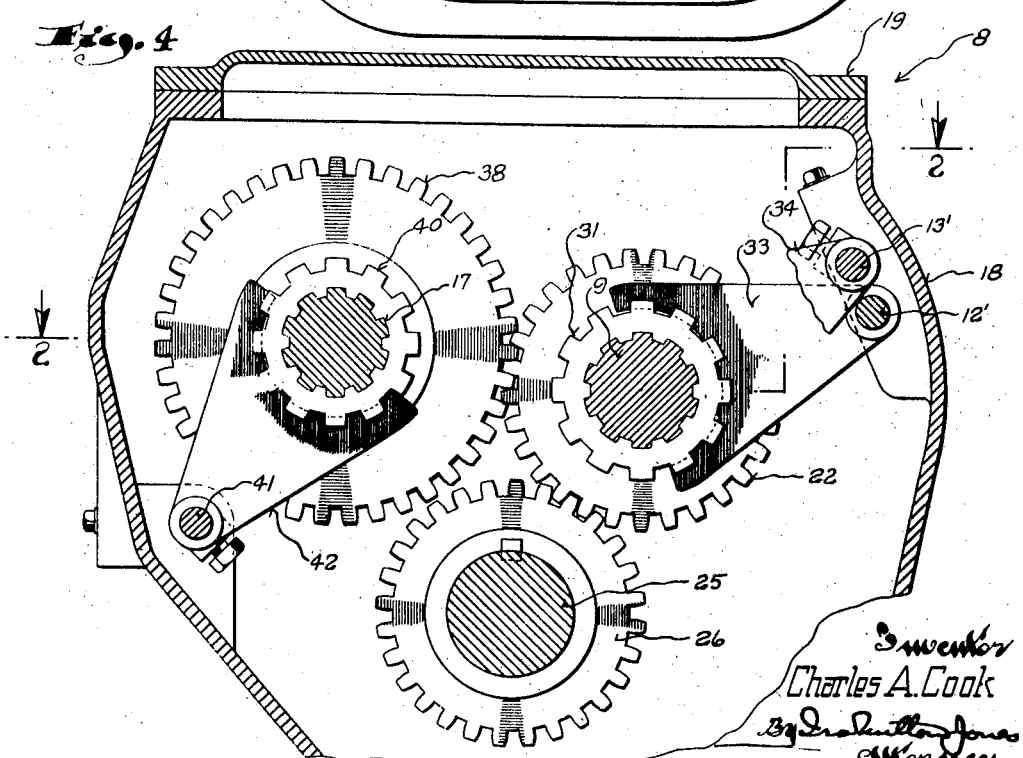
Figure 4 is a cross sectional view of the unit taken on the plane of the line 4—4 in Figure 2.

The clutch member 31 is shiftable by actuation of the link 12, the rear end of which connects to a shifter rod 12' on which a shifter fork 33 is secured; and the clutch member 32 is shiftable by the actuation of the link 13 which connects with a shifter rod 13' to which a shifter fork 34 is secured. With the clutch members 31 and 32 in the positions shown in Figure 2 the main shaft is entirely disconnected from the power input shaft. Overdrive or underdrive may be obtained by rendering the appropriate set of gears operative or, if desired, a direct driving connection may be established between the input shaft 7 and the main shaft by shifting the clutch member 31 forwardly into clutching engagement with teeth on the main gear 22.

The power take-off shaft 17 is journalled in bearings 35 and 36 mounted in the front and back walls 20 and 21, respectively. Either end of the shaft may protrude from the housing. In the present instance it is the rear end of the shaft which is accessible, and the opening in the front wall (through which the front end of the shaft would protrude) is closed by a removable cover plate 37. The projecting end of the shaft 17 is adapted to have a sprocket or other driving member mounted directly thereon, and by virtue of the rigid support provided for the shaft, outboard bearings or other supplemental support for the power take-off shaft is entirely obviated.

A pair of gears 38 and 39, as shown, are mounted on the power take-off shaft but are normally loose thereon. The gear 38 is at all times in mesh with the main gear 22, while the gear 39 is at all times in mesh with the gear 27 on the countershaft. Thus, the gears 38 and 39 revolve in opposite directions.

Either of the two gears may be clutched to the power take-off shaft by a clutch member or collar 40 splined to the power take-off shaft. Shifting of the clutch member 40 is effected by reciprocation of the link 14 which is connected with a shifter rod 41 through the medially pivoted lever 15, the rod 41 being provided with a shifter fork 42.

From the foregoing description, taken in connection with the accompanying drawings, it will be readily apparent to those skilled in the art that this invention provides an exceedingly advantageous manner of incorporating both an auxiliary transmission and a power take-off in automotive trucks; that the manner in which the power take-off shaft is mounted in the housing of the auxiliary transmission makes it sturdy enough to permit the customary sprocket or other driving member to be fixed directly on the power take-off shaft thereby obviating the need for outboard bearings or other supplemental shaft supports; that the arrangement of the power take-off shaft in the auxiliary transmission housing alongside the main shaft merely requires a slight increase in the overall width of the auxiliary transmission housing and does not entail increased height, which is an important factor; that the manner of mounting the power take-off shaft enables the same to protrude from either end of the housing so that the sprocket or other driving member may be mounted either in front or in back of the auxiliary transmission; that the provision of forward and reverse rotation for the power take-off shaft adapts the unit to uses which could not be accommodated with many of the past forms of power take-offs; that the manner in which the power take-off shaft is mounted enables the same to be incorporated in an auxiliary transmission previously installed without a power take-off shaft; and that such subsequent addition of the power take-off shaft can be quickly and easily effected.

What I claim as my invention is:

1. A combination auxiliary transmission and full torque power take-off for automotive trucks comprising: a housing having spaced end walls; a power input shaft entering the housing through one of said end walls; a main driven shaft projecting from the housing through the other end wall; change speed gearing within the housing for connecting said shafts in different driving ratios including a main gear at all times drivingly connected with the power input shaft and a countershaft, the countershaft having a plurality of gears fixed thereon, one of which is at all times in mesh with said main gear; aligned bearings carried by said end walls; a power take-off shaft journalled in said bearings and having one end projecting through one end wall of the housing to have a driving member mounted thereon; a pair of gears normally loose on said power take-off shaft, one of which is at all times in mesh with the main gear and the other of which is at all times in mesh with one of the gears fixed on the countershaft; and means for selectively clutching one or the other of said pair of gears to the power take-off shaft so that the power take-off shaft is driven either in one direction directly from the main gear or in the opposite direction through the countershaft.

2. A combination over and underdrive auxiliary transmission and full torque power take-off for installation in automotive trucks between the regular transmission and traction wheels so that the power to the traction wheels passes through the auxiliary transmission, comprising: a housing having spaced end walls; a power input shaft entering the housing through one end wall; a main shaft projecting from the housing through the other end wall; a main gear at all times drivingly connected to the power input shaft; a countershaft journalled in the housing and parallel with the power input and main shafts; a gear fixed on the countershaft at all times meshing with the main gear; a set of underdrive gears on the main shaft and countershaft; a set of overdrive gears on the main shaft and countershaft; means for selectively rendering either set of gears operative or both sets inoperative; a power take-off shaft journalled in the housing and having one end thereof projecting from one end wall to directly mount a driving member through which power may be transmitted from said power take-off shaft to instrumentalities to be driven; a pair of gears normally loose on said power take-off shaft, one of which is at all times in mesh with the main gear and the other of which is in mesh with a gear fixed on the countershaft; and means for selectively clutching either of said pair of gears to the power take-off shaft so as to provide either forward or reverse rotation for the power take-off shaft.

3. A combination auxiliary transmission and full torque power take-off for automotive trucks comprising: a housing having spaced end walls; a power input shaft entering the housing through one of said end walls; a main driven shaft projecting from the housing through the other end wall; change speed gearing within the housing for connecting said shafts in different driving ratios including a main gear at all times drivingly connected with the power input shaft and a countershaft, the countershaft having a plurality of gears fixed thereon, one of which is at all times in mesh with said main gear; the housing end walls having aligned holes; bearings mounted on the end walls in line with said holes; a cap adapted to close either of said holes and secured over one of them; a power take-off shaft of a diameter to pass through said holes and capable of carrying the full torque of the transmission, said power take-off shaft being journalled in said bearings with one end thereof projecting through the uncapped hole; a pair of gears normally loose on said power take-off shaft and disposed within the housing, one of said gears being at all times in mesh with the main gear and the other being at all times in mesh with one of the gears fixed on the countershaft; and means operable from the exterior of the housing for selectively clutching one or the other of said pair of gears to the power take-off shaft so that the power take-off shaft is driven either in one direction directly from the main gear or in the opposite direction through the countershaft.

4. In an auxiliary transmission of the type adapted to be connected between the regular transmission and the traction wheels of an automotive truck and having a power output shaft for supplying power to the traction wheels of the truck, and a countershaft adjacent to said power output shaft: a main driving gear at all times meshed with a gear fixed on the countershaft to drive the same; a power take-off shaft alongside said shafts and the main gear; means for drivingly connecting the power take-off shaft with the main drive gear including a gear on the power take-off shaft at all times in mesh with the main gear, and a manually operable clutch, engagement of which effects driving of the power take-off shaft in one direction; means for drivingly connecting the power take-off shaft with the countershaft including gears on the power take-off shaft and the countershaft at all times in mesh with each other, and a manually operable clutch, engagement of which effects driving of the power take-off shaft in the opposite direction; and clutch actuating means operable to affect engagement of only one of said clutches at any one time.

5. In an auxiliary transmission of the type adapted to be connected between the regular transmission and the traction wheels of an automotive truck and having a power output shaft for supplying power to the traction wheels of the truck, and a countershaft adjacent to said power output shaft and journalled for rotation together therewith inside a housing for the auxiliary transmission: a main drive gear inside the housing meshed with a gear fixed on the countershaft to drive the same; a power take-off embodied in said auxiliary transmission and comprising a power take-off shaft journalled alongside said shafts and the main gear in bearings rigidly supported by said housing, one end of the power take-off shaft being exposed on the exterior of the housing to directly mount a driving member through which the power take-off shaft may be drivingly connected with instrumentalities to be driven thereby other than the traction wheels of the truck; a pair of gears rotatable on axes fixed with respect to the power take-off shaft, one of the gears of said pair thereof being at all times in mesh with the main gear and the other of the gears of said pair thereof being at all times in mesh with a companion gear fixed on the countershaft whereby the gears comprising said pair thereof rotate in opposite directions; and means for selectively drivingly connecting either of the gears of said pair thereof with the power take-off shaft so as to enable the power take-off shaft to be driven in one direction or the other.

6. In an auxiliary transmission of the type adapted to be connected between the regular transmission and the traction wheels of an automotive truck and having a power output shaft for supplying power to the traction wheels of the truck, and a countershaft adjacent to said power output shaft and journalled for rotation together therewith inside a housing for the auxiliary transmission: a main drive gear inside the housing meshed with a gear fixed on the countershaft to drive the same; a power take-off shaft in the housing journalled alongside said shafts and the main gear in bearings rigidly supported by said housing and having one end exposed on the exterior of the housing to directly mount a driving member through which the power take-off shaft may be drivingly connected with instrumentalities to be driven thereby other than the traction wheels of the truck; separate forward and reverse gears freely rotatably mounted on said power take-off shaft, one of said gears being meshed at all times with the main driving gear, and the other of said gears being meshed at all times with a companion gear fixed on the countershaft so that said forward and reverse gears rotate in opposite directions relative to the power take-off shaft; and a single manually operative clutch mechanism for selectively drivingly connecting said freely rotatable gears with the power take-off shaft.

CHARLES A. COOK.

REFERENCES CITED

The following references are of record in the file of this patent:

UNITED STATES PATENTS

| Number | Name | Date |
|---|---|---|
| 2,087,166 | Saives | July 13 1937 |
| 2,386,540 | Campodonico | Oct. 9, 1945 |

FOREIGN PATENTS

| Number | Country | Date |
|---|---|---|
| 325,430 | Germany | Sept. 13, 1920 |